(12) United States Patent
Chen et al.

(10) Patent No.: US 7,701,913 B2
(45) Date of Patent: Apr. 20, 2010

(54) METHODS AND APPARATUS FOR PROVIDING A PLATFORM COEXISTENCE SYSTEM OF MULTIPLE WIRELESS COMMUNICATION DEVICES

(75) Inventors: Camille Chen, Cupertino, CA (US); Gedon Rosner, Jerusalem (IL); Boris Ginzburg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 376 days.

(21) Appl. No.: 11/263,778

(22) Filed: Oct. 31, 2005

(65) Prior Publication Data

US 2007/0099567 A1 May 3, 2007

(51) Int. Cl.
*H04W 4/00* (2006.01)
*H04M 1/00* (2006.01)
(52) U.S. Cl. .............. 370/338; 455/552.1; 455/41.1
(58) Field of Classification Search ............... 455/552.1, 455/553.1, 63.1, 114.2, 450, 41.2, 426.1; 370/338
See application file for complete search history.

(56) References Cited

U.S. PATENT DOCUMENTS

| | | | |
|---|---|---|---|
| 5,724,647 A * | 3/1998 | Sato .................. | 455/552.1 |
| 6,326,926 B1 * | 12/2001 | Shoobridge et al. ........ | 343/702 |
| 6,526,034 B1 * | 2/2003 | Gorsuch .................. | 370/338 |
| 6,590,928 B1 * | 7/2003 | Haartsen ................. | 375/134 |
| 2001/0051530 A1 * | 12/2001 | Shiotsu et al. ............ | 455/522 |
| 2002/0136184 A1 * | 9/2002 | Liang et al. .............. | 370/338 |
| 2003/0228892 A1 * | 12/2003 | Maalismaa et al. ........ | 455/575.7 |
| 2004/0029619 A1 * | 2/2004 | Liang et al. ............. | 455/562.1 |
| 2004/0160370 A1 * | 8/2004 | Ghosh et al. ............. | 343/702 |
| 2004/0162106 A1 * | 8/2004 | Monroe et al. ........... | 455/552.1 |
| 2004/0259589 A1 * | 12/2004 | Bahl et al. ............... | 455/553.1 |
| 2005/0215197 A1 | 9/2005 | Chen et al. | |
| 2006/0013176 A1 * | 1/2006 | De Vos et al. ............ | 370/338 |
| 2006/0062235 A1 | 3/2006 | Ginzburg | |

FOREIGN PATENT DOCUMENTS

| | | |
|---|---|---|
| EP | 1 388 951 A2 | 2/2004 |
| EP | 1 583 295 A2 | 10/2005 |
| WO | WO 2004/045092 A1 | 5/2004 |
| WO | WO 2005/020518 A1 | 3/2005 |

OTHER PUBLICATIONS

Boris Ginzburg et al., "Device, System and Method of Coordination Among Wireless Transceivers", U.S. Appl. No. 11/238,146, filed Sep. 29, 2005.

* cited by examiner

*Primary Examiner*—Lester Kincaid
*Assistant Examiner*—Daniel Lai
(74) *Attorney, Agent, or Firm*—Schwabe, Williamson & Wyatt, P.C.

(57) ABSTRACT

Embodiments of methods and apparatus for providing a platform coexistence system of multiple wireless communication devices are generally described herein. Other embodiments may be described and claimed.

15 Claims, 5 Drawing Sheets

METHODS AND APPARATUS FOR PROVIDING A PLATFORM COEXISTENCE SYSTEM OF MULTIPLE WIRELESS COMMUNICATION DEVICES

TECHNICAL FIELD

The present disclosure relates generally to wireless communication systems, and more particularly, to methods and apparatus for providing a platform coexistence system of multiple wireless communication devices.

BACKGROUND

As wireless communication becomes more and more popular at offices, homes, schools, etc., different wireless technologies and applications may work in tandem to meet the demand for computing and communications at anytime and/or anywhere. For example, a variety of wireless communication networks may co-exist to provide a wireless environment with more computing and/or communication capability, greater mobility, and/or eventually seamless roaming.

In particular, wireless personal area networks (WPANs) may offer fast, short-distance connectivity within a relatively small space such as an office workspace or a room within a home. Wireless local area networks (WLANs) may provide broader range than WPANs within office buildings, homes, schools, etc. Wireless metropolitan area networks (WMANs) may cover a greater distance than WLANs by connecting, for example, buildings to one another over a broader geographic area. Wireless wide area networks (WWANs) may provide the broadest range as such networks are widely deployed in cellular infrastructure. Although each of the above-mentioned wireless communication networks may support different usages, co-existence among these networks may provide a more robust environment with anytime and anywhere connectivity.

DETAILED DESCRIPTION

In general, methods and apparatus for providing a platform coexistence system of multiple wireless communication devices are described herein. The methods and apparatus described herein are not limited in this regard.

Figure 1:
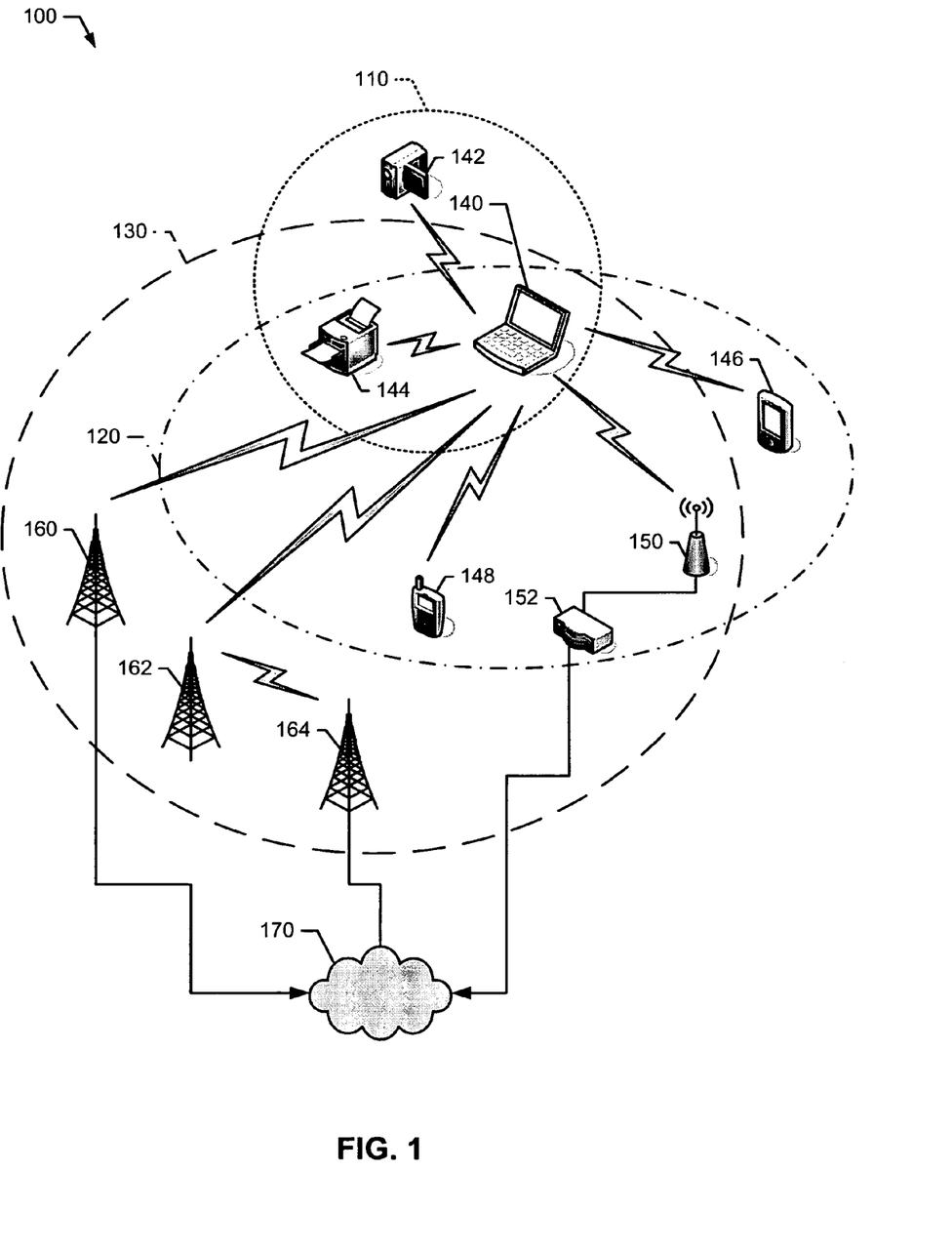
FIG. 1 is a schematic diagram representation of an example wireless communication system according to an embodiment of the methods and apparatus disclosed herein.

Referring to FIG. 1, an example wireless communication system 100 may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication networks 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts five subscriber stations, the wireless communication system 100 may include more or less subscriber stations.

The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16, published 2004) to communicate with base stations, generally shown as 160, 162, and 164, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards. Although FIG. 1 depicts a WPAN, a WLAN, and a WMAN, the wireless communication system 100 may include other combinations of WPANs, WLANs, WMANs, and/or WWANs. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
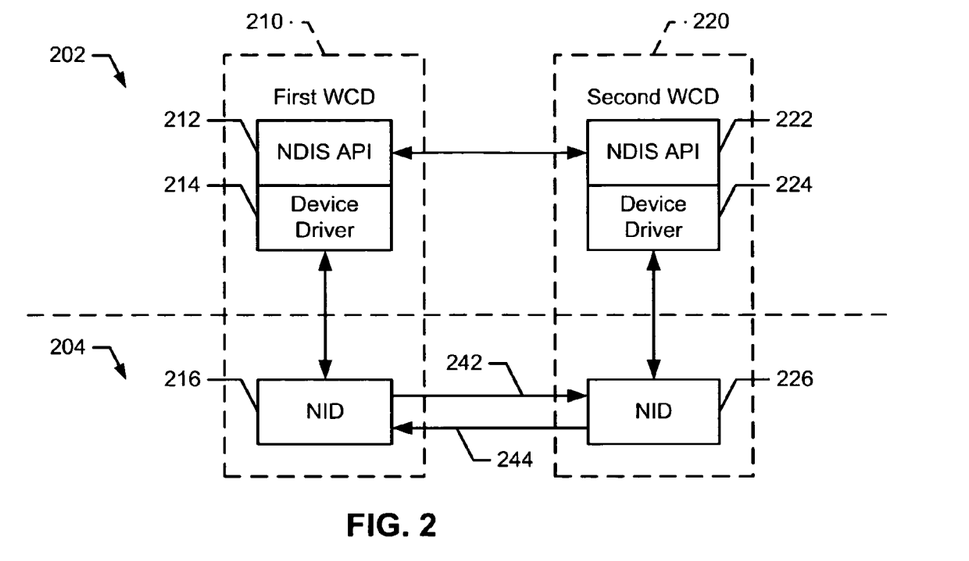
FIG. 2 is a block diagram representation of an example platform coexistence system of multiple wireless communication devices.

In the example of FIG. 2, a platform coexistence system 200 may include two or more wireless communication devices, generally shown as 210 and 220. The platform coexistence system 200 may be integrated into a single platform such as a subscriber station (e.g., the subscriber station 400 of FIG. 4). The first wireless communication device (WCD) 210 may include a first network device interface specification (NDIS) application program interface (API) 212, a first device driver 214, and a first network interface device (NID) 216. The second wireless communication device (WCD) 220 may include a second NDIS API 222, a second device driver 224, and a second NID 226.

In general, the first and second WCDs 210 and 220 may interact with each other via software (and/or firmware) and hardware. On a software and/or firmware level 202 of the platform coexistence system 200, the first NDIS API 212 and the first device driver 214 may be operatively coupled to the second NDIS API 222 and the second device deriver 224 to exchange configuration information of the first and second WCDs 210 and 220. On a hardware level 204 of the platform coexistence system 200, the first and second NIDs 216 and 226 may be operatively coupled to each other via one or more wired links, generally shown as 242 and 244, to communicate priority information between the first and second WCDs 210 and 220. In particular, each of the wired links 242 and 244 may be uni-directional to transmit priority information (e.g., priority signals) as described in detail below. In one example, the first NID 216 may transmit a priority signal from the first NID 216 to the second NID 226 via the first wired link 242 whereas the second NID 226 may transmit a priority signal from the second NID 226 to the first NID 216 via the second wired link 244. Although FIG. 2 depicts two separate, unidirectional wired links operatively coupling the first and second NIDs 216 and 226, the first and second NIDs 216 and 226 may be operatively coupled to each other with a single bi-directional wired link. Thus, priority signals from either the first NID 216 or the second NID 226 may be transmitted on the same wired link.

The first WCD 210 may provide communication services associated with a first wireless communication network (e.g., the WLAN 120 of FIG. 1) and the second WCD 220 may be associated with a second wireless communication network (e.g., the WMAN 130 of FIG. 1). Although the first and second WCDs 210 and 220 may be associated with wireless communication networks based on different wireless technologies, the first and second WCDs 210 and 220 may operate within an identical frequency range, adjacent frequency ranges, overlapping frequency ranges, or relatively proximate frequency ranges that may cause interference. In one example, the first wireless communication network may operate based on Wi-Fi technology, and the second wireless communication network may operate based on WiMAX technology. Accordingly, following the above example, the first WCD 210 may communicate based on Wi-Fi technology whereas the second WCD 220 may communicate based on WiMAX technology.

Briefly, Wi-Fi technology provides high-speed wireless connectivity within a range of a wireless access point (e.g., a hotspot) in different locations including homes, offices, cafes, hotels, airports, etc. In particular, Wi-Fi technology may allow a wireless device to connect to a local area network without physically plugging the wireless device into the network when the wireless device is within a range of wireless access point (e.g., within 150 feet indoor or 300 feet outdoors). In one example, Wi-Fi technology may offer high-speed Internet access and/or Voice over Internet Protocol (VoIP) service connection to wireless devices. Wi-Fi technology may operate in a frequency range starting at 2.4 gigahertz (GHz) and ending at 2.4835 GHz. The 802.11 family of standards were developed by IEEE to provide for WLANs (e.g., the IEEE std. 802.11a, published 1999; the IEEE std. 802.11b, published 1999; the IEEE std. 802.11g, published 2003). The Wi-Fi Alliance facilitates the deployment of WLANs based on the 802.11 standards. In particular, the Wi-Fi Alliance ensures the compatibility and inter-operability of WLAN equipment. For convenience, the terms "802.11" and "Wi-Fi" may be used interchangeably throughout this disclosure to refer to the IEEE 802.11 suite of air interface standards. The methods and apparatus described herein are not limited in this regard.

WiMAX technology provides last-mile broadband connectivity in a larger geographical area than other wireless technology such as Wi-Fi technology. In particular, WiMAX technology may provide broadband or high-speed data connection to various geographical locations where wired transmission may be too costly, inconvenient, and/or unavailable. In one example, WiMAX technology may offer greater range and bandwidth to enable T1-type service to businesses and/or cable/digital subscriber line (DSL)-equivalent access to homes. WiMAX technology may operate in a frequency band ranging from 2 to 11 GHz (e.g., 2.3 to 2.4 GHz, 2.5 to 2.7 GHz, 3.3 to 3.8 GHz, or 4.9 to 5.8 GHz). The 802.16 family of standards were developed by IEEE to provide for fixed, portable, and/or mobile broadband wireless access networks (e.g., the IEEE std. 802.16, published 2004). The WiMAX Forum facilitates the deployment of broadband wireless access networks based on the IEEE 802.16 standards. In particular, the WiMAX Forum ensures the compatibility and inter-operability of broadband wireless equipment. For convenience, the terms "802.16" and "WiMAX" may be used interchangeably throughout this disclosure to refer to the IEEE 802.16 suite of air interface standards. The methods and apparatus described herein are not limited in this regard.

As described in detail below, the first and second WCDs 210 and 220 of the platform coexistence system 200 may operate concurrently by coordinating and operating in a collocation manner (e.g., function in parallel). In one example, the platform coexistence system 200 of FIG. 2 may be implemented in the laptop computer 140 of FIG. 1. As noted above, in one example, the first WCD 210 may communicate based on Wi-Fi technology and the second WCD 220 may communicate based on WiMAX technology. In particular, the laptop computer 140 may use the first WCD 210 to communicate with WLAN device(s) of FIG. 1 such as the printer 144, the handheld computer 146, the smart phone 148 and/or the access point 150. The laptop computer 140 may use the second WCD 220 to communicate with WMAN device(s) of FIG. 1 such as the base station(s) 160, 162, and/or 164. The methods and apparatus described herein are not limited in this regard.

In general, Wi-Fi technology may operate in a frequency range from 2.4 to 2.4835 GHz, and WiMAX technology may operate in a frequency range from 2.3 GHz to 2.7 GHz. Accordingly, concurrent use of Wi-Fi technology and WiMAX technology may potentially cause considerable interference. In particular, the interference may be caused by close proximity of frequency, high power transmission, low antenna isolation, and/or requirement of high signal-to-noise ratio for high data rate modulation (e.g., 64 quadrature amplitude modulation (QAM)). In one example, transmission using Wi-Fi technology may affect reception using WiMAX technology or vice versa. To mitigate the potential interference between co-existing Wi-Fi technology and WiMAX technology, the first and second WCDs 210 and 220 may be configured to operate in a collocation manner as described in detail below. While the above examples are described with respect to Wi-Fi and WiMAX technologies, the first and second WCDs 210 and 220 may be based on other wireless technologies.

Turning back to FIG. 2, the first and the second WCDs 210 and 220 may exchange configuration information with each other. In particular, the device drivers 214 and 224 may exchange configuration information with each other via the NDIS APIs 216 and 226, respectively. The configuration information of each wireless communication device may indicate a manner in which the wireless communication device communicates via a wireless link in the respective wireless communication network. For example, the device drivers 214 and 224 may exchange information indicative of channels used by and/or assigned to the first and second WCDs 210 and 220, respectively. In addition to channel information, the device drivers 214 and 224 may also exchange information indicative of bandwidth, transmission power, front-end filter, reception sensitivity, antenna isolation, and/or other suitable information associated with the first and second WCDs 210 and 220, respectively.

Based on the configuration information, the first and second WCDs 210 and 220 may operate in a collocation manner. In particular, each of the first and second device drivers 214 and 224 may determine whether to adjust wireless configurations of the NIDs 216 and 226, respectively, to communicate via wireless links. In one example, the first device driver 214 may reduce transmission power of the first WCD 210 (e.g., reduce to 0 decibel milliwatt (dBm)) if the current output power is relatively high (e.g., more than 10 dBm). In another example, the first device driver 214 may reduce transmission power of the first WCD 210 if conditions for antenna isolation are relatively poor (e.g., less than 30 dB). In yet another example, the first device driver 214 may also reduce transmission power of the first WCD 210 if the first WCD 210 is not used for multi-hop purposes in mesh networks. In addition or alternatively, the first device driver 214 may adjust reception sensitivity of the first WCD 210 to tolerate higher interference input power if the output power of the second WCD 220 is relatively high (e.g., more than 20 dBm) and/or if antenna isolation conditions are relatively poor (e.g., less than 40 dB). Although the above examples are described with respect to transmission output power and reception sensitivity, the methods and apparatus described herein may adjust other suitable wireless configurations of the first and second WCDs 210 and 220.

Each of the first and second device drivers 214 and 224 may also determine whether to generate an outbound priority signal based on the configuration information. In one example, the first NID 216 may generate an outbound priority signal if the first NID 216 is communicating critical information (e.g, receiving and/or transmitting critical information) and if the first and second NIDs 216 and 226 are using an identical frequency range, adjacent frequency ranges, overlapping frequency ranges, or relatively proximate frequency ranges (e.g., less than 100 megahertz (MHz) in spacing between the frequency ranges). Critical information may be packets such as a beacon, audio packet(s), video packet(s), and/or data packet(s). If the first device driver 214 decides to generate the outbound priority signal, the first NID 216 may transmit the outbound priority signal to the second NID 226 via the first wired link 242 so that the second device driver 224 may process the outbound priority signal as described in detail below (e.g., the outbound priority signal from the first NID 216 is an inbound priority signal relative to the second device driver 224).

In a similar manner, the second NID 226 may determine whether to generate an outbound priority signal based on the configuration information. The second NID 226 may generate an outbound priority signal if the second NID 226 is communicating critical information and if the first and second NIDs 216 and 226 are using an identical frequency range, adjacent frequency ranges, overlapping frequency ranges, or relatively proximate frequency ranges. If the second device driver 224 decides to generate the outbound priority signal, the second NID 226 may to transmit the outbound priority signal to the first NID 216 via the second wired link 244.

Accordingly, each of the first and second device drivers 214 and 216 may determine whether the first and second NIDs 216 and 226, respectively, received an inbound priority signal. In particular, the first NID 216 may receive an inbound priority signal from the second NID 226 via the second wired link 244. The second NID 226 may receive an inbound priority signal from the first NID 216 via the first wired link 242.

In one example, the first device driver 214 may determine whether the wireless communication activity of the first WCD 210 has higher priority than the wireless communication activity of the second WCD 220 based on the inbound priority signal from the second NID 226 via the first wired link 242. If the wireless communication activity of the first WCD 210 has higher priority than the wireless communication activity of the second WCD 220, the first device driver 214 may ignore or disregard the inbound priority signal from the second NID 226. Accordingly, the first device driver 214 and/or the first NID 216 may continue to perform the wireless communication activity of the first WCD 210.

Otherwise if the wireless communication activity of the first WCD 210 has lower priority than the wireless communication activity of the second WCD 220, the first device driver 214 and/or the first NID 216 may give priority to the wireless communication activity of the second WCD 220. For example, the first device driver 214 and/or the first NID 216 may hold transmission of one or more packets and/or selectively drop one or more packets from transmission to balance the performance of the first and second WCDs 210 and 220.

In a similar manner as described with respect to the first device driver 214, the second device driver 224 may determine whether the wireless communication activity of the second WCD 220 has higher priority than the wireless communication activity of the first WCD 210 based on the inbound priority signal from the first NID 216 via the second wired link 244. If the wireless communication activity of the second WCD 220 has higher priority than the wireless communication activity of the first WCD 210, the second device driver 224 may ignore or disregard the inbound priority signal from the first NID 216. In one example, the wireless communication activity of the second WCD 220 may be critical information as described above. Accordingly, the second device driver 224 and/or the second NID 226 may continue to perform the wireless communication activity of the second WCD 220.

Otherwise if the wireless communication activity of the second WCD 220 has lower priority than the wireless communication activity of the first WCD 210 (e.g., communicating critical information at the first WCD 210), the second device driver 224 and/or the second NID 226 may give priority to the wireless communication activity of the first WCD 210. For example, the second device driver 224 and/or the second NID 226 may hold transmission of one or more packets and/or selectively drop one or more packets from transmission to balance the performance of the first and second WCDs 210 and 220. As a result, the platform coexistence system 200 may mitigate interference between the first and second WCDs 210 and 220. The methods and apparatus described herein are not limited in this regard.

Figure 3:
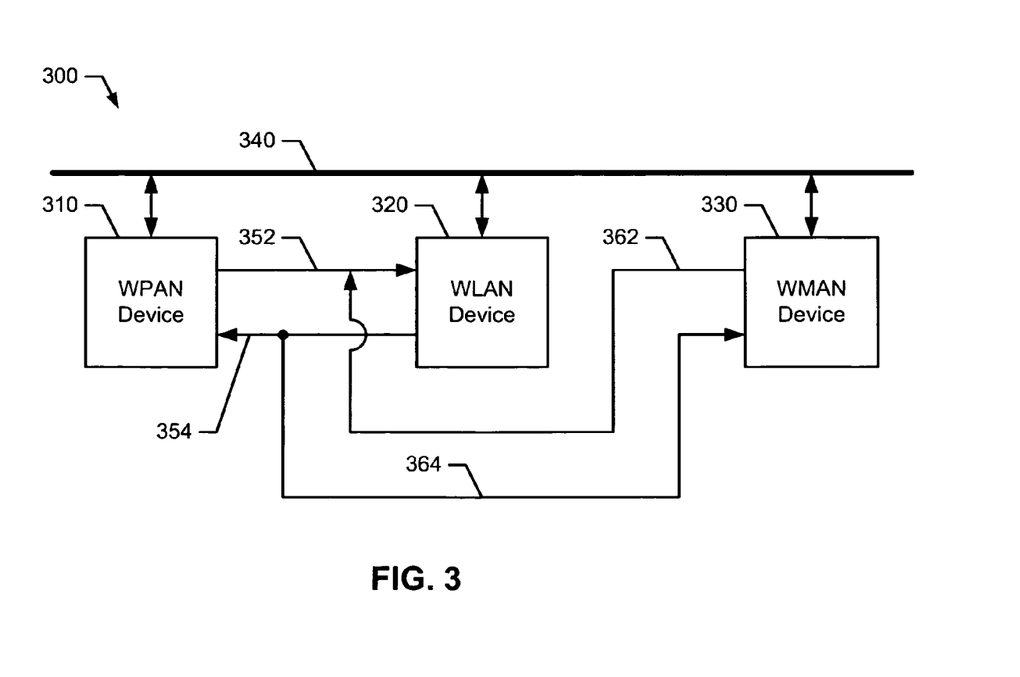
FIG. 3 is a block diagram representation of another example platform coexistence system of multiple wireless communication devices.

Although FIG. 2 depicts two wireless communication devices, the methods and apparatus described herein may include additional wireless communication devices. Referring to FIG. 3, for example, the platform coexistence system 300 may include three or more wireless communication devices, generally shown as 310, 320, and 330. The platform coexistence system 300 may be integrated into a single platform. The methods and apparatus described herein are not limited in this regard.

In one example, the platform coexistence system 300 may include a WPAN device 310, a WLAN device 320, and a WMAN device 330. The WPAN device 310 may operate based on a relatively shorter-distance technology such as Bluetooth® technology (e.g., the IEEE std. 802.15.1 published in 2002, variations, and/or evolutions of this standard) or UWB technology (e.g., the IEEE std. 802.15.3 published in 2003, variations, and/or evolutions of this standard). Alternatively, the WPAN device 310 may operate based on radio frequency identification (RFID) technology or Wi-Fi technology.

The WLAN device 320 may operate based on Wi-Fi technology (e.g., IEEE std. 802.11x) and the WMAN device 330 may operate based on WiMAX technology (e.g., IEEE std. 802.16x). To exchange configuration information with each other, the WPAN device 310, the WLAN device 320, and the WMAN device 330 may be operatively coupled to each other via a bus 340. To transmit priority signals, the WPAN device 310 and the WLAN device 320 may be operatively coupled to each other via one or more wired links, generally shown as 352 and 354. Each of the wired links 352 and 354 may be unidirectional to transmit priority signals from a respective wireless communication device. In one example, the WPAN device 310 may transmit a priority signal to the WLAN device 320 via the wired link 352, and the WLAN device 320 may transmit a priority signal to the WPAN device 310 via the wired link 354.

Following the above example, the WMAN device 330 may be operatively coupled to the WLAN device 320 via one or more wired links, generally shown as 362 and 364. In particular, the wired link 362 may be operatively coupled to the wired link 352. As a result, the WMAN device 330 may transmit a priority signal to the WLAN device 320 via the wired links 352 and 362. In a similar manner, the wired link 364 may be operatively coupled to the wired link 354 so that the WLAN device 320 may transmit a priority signal the WMAN device 330 via the wired links 354 and 364.

While FIG. 3 depicts a particular manner in which the wireless communication devices 310, 320, and 330 are operatively coupled to each other, the wireless communication devices 310, 320, and 330 may be operatively coupled to exchange configuration information and to transmit priority signals in other suitable manners. Although FIG. 3 depicts one of a WPAN device, a WLAN device, and WMAN device within the platform coexistence system 300, the methods and apparatus described herein may include other wireless communication devices that may operate in accordance with other suitable types of wireless communication networks and/or include other combinations of wireless communication devices. In one example, the platform coexistence system 300 may include a wireless communication device for a WWAN as an additional wireless communication device or a substitute wireless communication device. In another example, the platform coexistence system 300 may include a first WPAN device, a second WPAN device, and a WMAN device. Wi-Fi technology may be used by one or both of the first and second WPAN devices. The methods and apparatus described herein are not limited in this regard.

Figure 4:
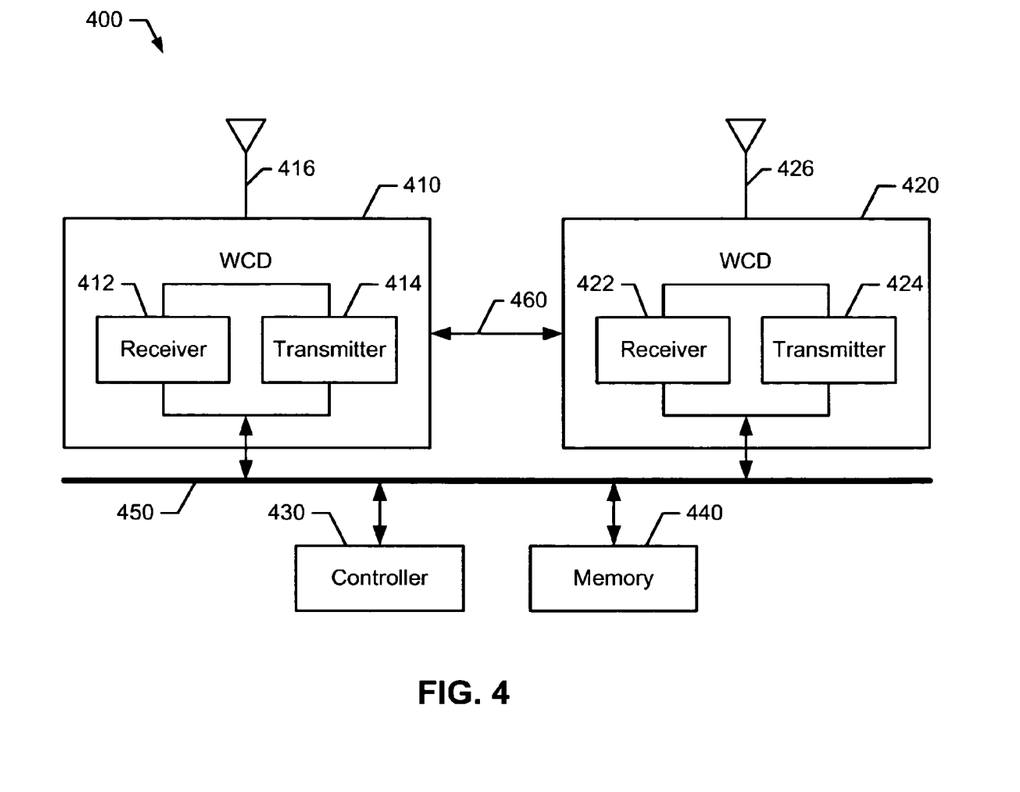
FIG. 4 is a block diagram representation of an example subscriber station.

As noted above, the platform coexistence systems 200 and 300 may be implemented in a subscriber station. Turning to FIG. 4, for example, a subscriber station 400 may include two or more WCDs, generally shown as a first WCD 410 and a second WCD 420. The subscriber station 400 may also include a controller 430 and a memory 440. The first and second WCDs 410 and 420, the controller 430, and the memory 440 may be operatively coupled to each other via a bus 450.

Each of the first and second WCDs 410 and 420 may include a receiver, generally shown as 412 and 422, respectively. Each of the first and second WCDs 410 and 420 may include a transmitter, generally shown as 414 and 424, respectively. The first WCD 410 may receive and/or transmit data via the receiver 412 and the transmitter 414, respectively. The second WCD 420 may receive and/or transmit data via the receiver 422 and the transmitter 424, respectively. Each of the first and second WCDs 410 and 420 may include an antenna, generally shown as 416 and 426. Each of the antennas 416 and 426 may include one or more directional or omni-directional antennas such as dipole antennas, monopole antennas, patch antennas, loop antennas, microstrip antennas, and/or other types of antennas suitable for transmission of RF signals. Although FIG. 4 depicts a single antenna for each of the first and second WCDs 410 and 420, each of the first and second WCDs 410 and 420 may include additional antennas. For example, each of the first and second WCDs 410 and 420 may include a plurality of antennas to implement a multiple-input-multiple-output (MIMO) system.

For the first and second WCDs 410 and 420 to operate in a collocation manner, the controller 430 may facilitate the exchange of configuration information between the first and second WCDs 410 and 420 as described in connection with FIG. 5. The memory 440 may be used to store the configuration information and/or other suitable information.

Although FIG. 4 depicts components of the subscriber station 400 coupling to each other via a bus 450, these components may be operatively coupled to each other via other suitable direct or indirect connections (e.g., a point-to-point connection or a point-to-multiple point connection). In one example, the first and second WCDs 410 and 420 may be operatively coupled to each via one or more wired links 460 to exchange priority information. While FIG. 4 depicts a single bi-directional wired link, the wired link 460 may include two separate, uni-directional wired links operatively coupling the first and second WCDs 410 and 420. For example, the first WCD 410 may use one wired link to transmit priority information to the second WCD 420, and the second WCD 420 may use another wired link to transmit priority information to the first WCD 410.

Although the components shown in FIG. 4 are depicted as separate blocks within the subscriber station 400, the functions performed by some of these blocks may be integrated within a single semiconductor circuit or may be implemented using two or more separate integrated circuits. For example, although the receiver 412 and the transmitter 414 are depicted as separate blocks within the communication interface 410, the receiver 412 may be integrated into the transmitter 414 (e.g., a transceiver). Further, while FIG. 4 depicts two WCDs, the subscriber station 400 may include additional WCDs. Although the above examples are described with respect to a subscriber station, the methods and apparatus described herein may be implemented in other suitable devices such as a wireless network gateway, router, modem, hub, etc. The methods and apparatus described herein are not limited in this regard.

Figure 5:
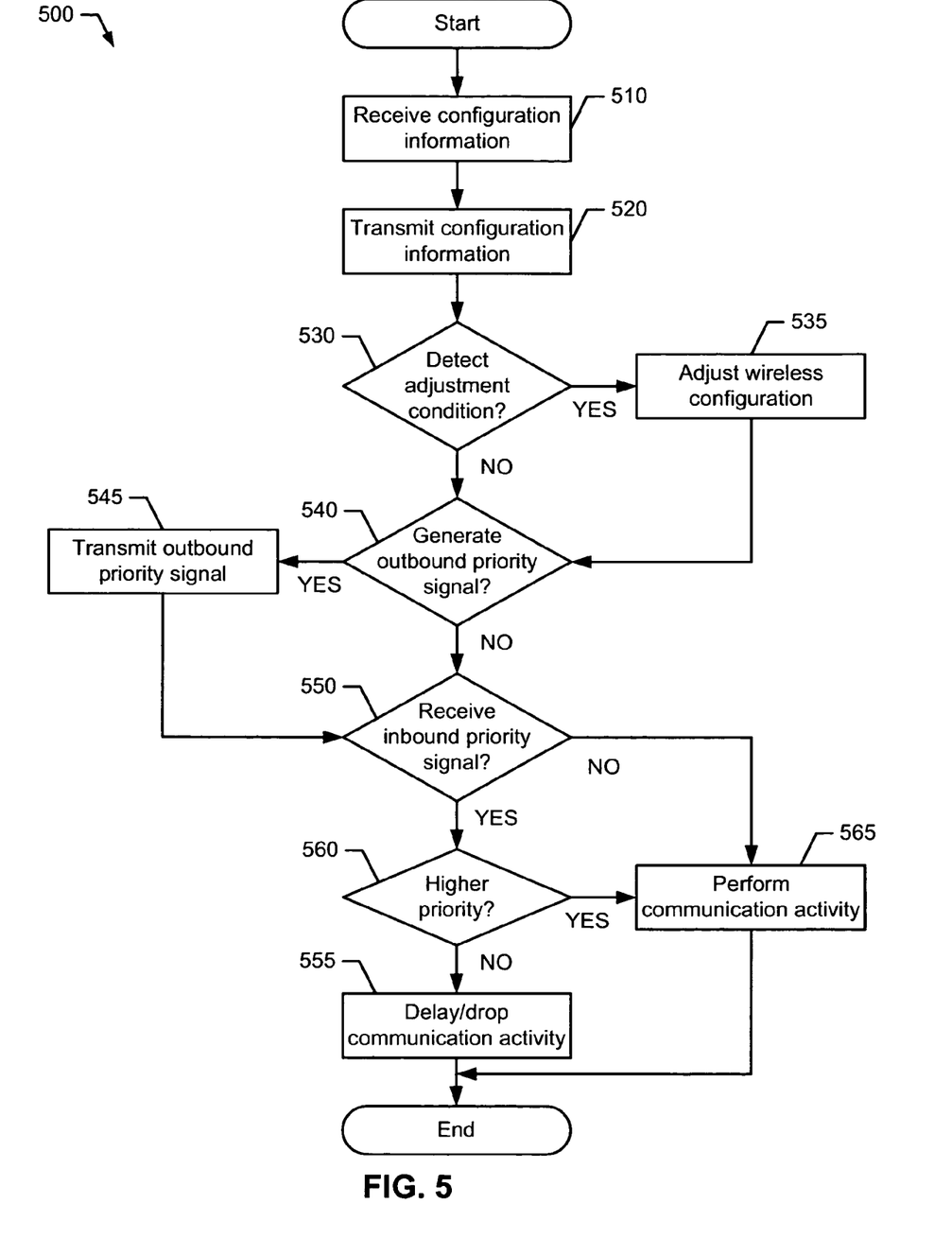
FIG. 5 is a flow diagram representation of one manner in which the example subscriber station of FIG. 4 may be configured.

FIG. 5 depicts one manner in which wireless communication devices may be configured to provide the example platform coexistence system(s) of FIGS. 2 and/or 3. The example process 500 of FIG. 5 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 5, these actions may be performed in other temporal sequences. Again, the example process 500 is merely provided and described in conjunction with the apparatus of FIG. 4 as an example of one way to provide a platform coexistence system.

In the example of FIG. 5, the process 500 may begin with the first and second WCDs 410 and 420 (e.g., via the controller 430) exchanging configuration information with each other. In particular, the first WCD 410 may receive configuration information associated with the second WCD 420. For example, the first WCD 410 may receive information indicative channel, bandwidth, transmission power, front-end filter, reception sensitivity, or antenna isolation associated with the second WCD 420 (block 510). Accordingly, the first WCD 410 may transmit configuration information associated with the first WCD 410 to the second WCD 420 (block 520). For example, the first WCD 410 may transmit configuration information to the second WCD 420 in response to detecting that the second WCD 420 is turned on.

Based on the configuration information, the first WCD 410 may determine whether to adjust wireless configurations of the first WCD 410 to communicate via a wireless link. In particular, the first WCD 410 may monitor for an adjustment condition (block 530). If the first WCD 410 fails to detect an adjustment condition, control may proceed directly to block 540 as described in detail below.

Otherwise if the first WCD 410 detects an adjustment condition, the first WCD 410 may adjust the wireless configurations of the first WCD 410 (block 535). In one example, the first WCD 410 may reduce transmission power (e.g., reduce to 0 decibel milliwatt (dBm)) if the current output power is relatively high (e.g., more than 10 dBm). In another example, the first WCD 410 may reduce transmission power if conditions for antenna isolation are relatively poor (e.g., less than 30 dB). In yet another example, the first WCD 410 may also reduce transmission power if the first WCD 410 is not used for multi-hop purposes in mesh networks. In addition or alternatively, the first WCD 410 may adjust reception sensitivity to tolerate higher interference input power if the output power of the second WCD 420 is relatively high (e.g., more than 20 dBm) and/or if antenna isolation conditions are relatively poor (e.g., less than 40 dB). As described in detail below, control may proceed to block 540.

The first WCD 410 may determine whether to generate an outbound priority signal to the second WCD 420 based on the configuration information (block 540). In one example, the first WCD 410 may generate the outbound priority signal if the first WCD 410 is communicating critical information and if the first and second WCDs 410 and 420 are using an identical frequency range, adjacent frequency ranges, overlapping frequency ranges, or relatively proximate frequency ranges.

If the first WCD 410 does not generate an outbound priority signal, control may proceed directly to block 550 as described in detail below. Otherwise if the first WCD 410 generates an outbound priority signal, the first WCD 410 may transmit the outbound priority signal to the second WCD 420 (block 545). As described in detail below, control may proceed to block 550.

Turning to block 550, the first WCD 410 may monitor for an inbound priority signal from the second WCD 420. If the first WCD 410 does not receive an inbound priority signal, control may proceed directly to block 555 to perform communication activity of the first WCD 410.

Otherwise if the first WCD 410 receives an inbound priority signal at block 550, the first WCD 410 may determine whether a communication activity of the first WCD 410 has higher priority than a communication activity of the second WCD 420 as indicated by the inbound priority signal (block 560). If the communication activity of the first WCD 410 does not have higher priority than the communication activity of the second WCD 420, the first WCD 410 may give priority to the communication activity of the second WCD 420. In one example, the first WCD 410 may hold transmission of one or more packets and/or selectively drop one or more packets from transmission.

Otherwise if the communication activity of the first WCD 410 has higher priority than the communication activity of the second WCD 420, the first WCD 410 may ignore the inbound priority signal from the second WCD 420 (block 565). Accordingly, the first WCD 410 may proceed to block 555 to perform the communication activity of the first WCD 410. The second WCD 420 may operate in a similar manner as described in connection with FIG. 5 to provide a platform coexistence system. The methods and apparatus described herein are not limited in this regard.

Figure 6:
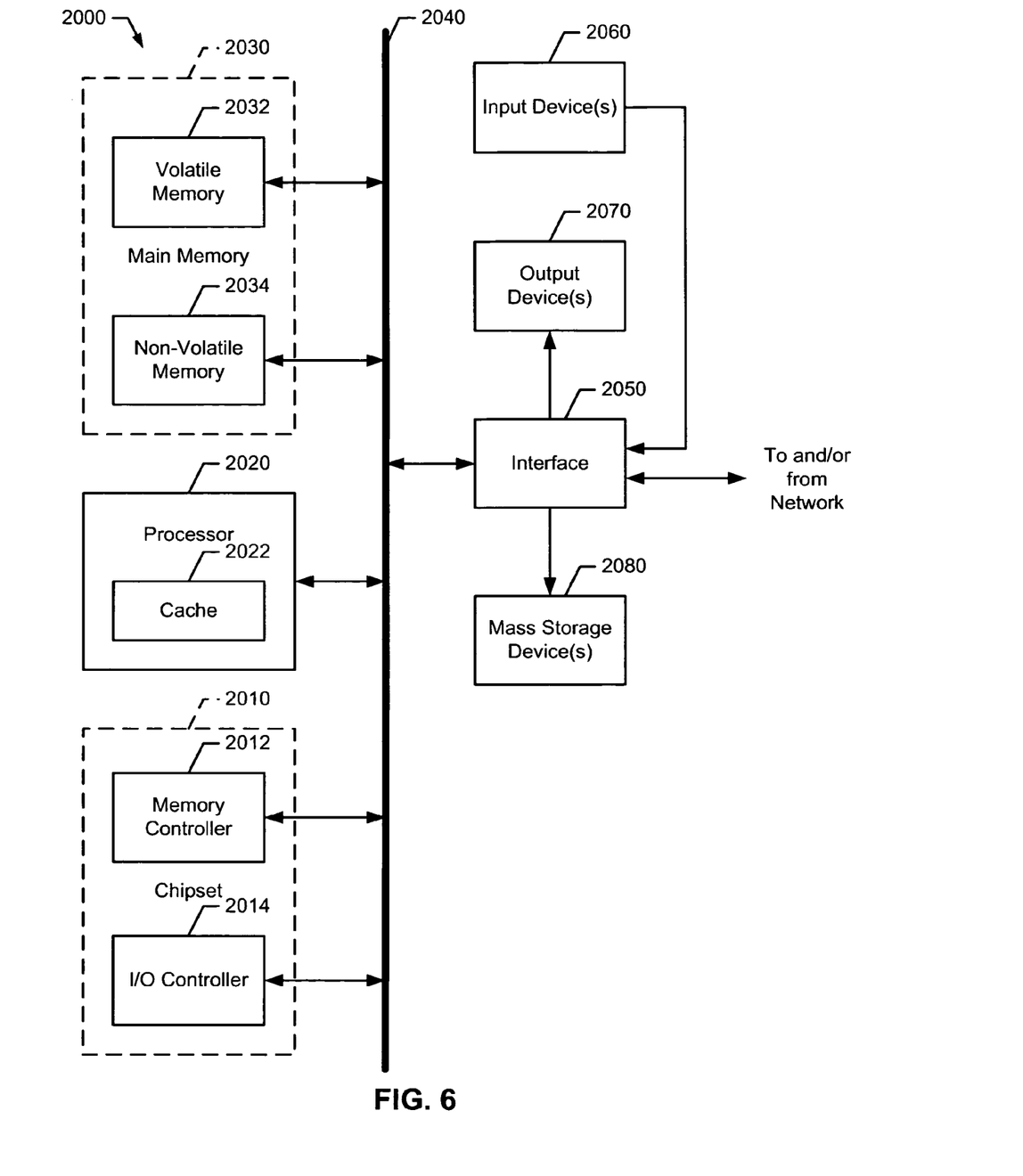
FIG. 6 is a block diagram representation of an example processor system that may be used to implement the example subscriber station of FIG. 4.

FIG. 6 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 6 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WPAN components, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 6 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:

exchanging, via a software interface, configuration information between a first wireless communication device associated with a first wireless communication network and a second wireless communication device associated with a second wireless communication network, wherein the configuration information includes at least transmitter power and antenna isolation information of the first wireless communication device and the second wireless communication device, and wherein the first communication network operates on Wi-Fi technology and the second wireless communication network operates on WiMAX technology and the first and second wireless communication devices are integrated within a single platform and operatively coupled to each other via one or more wired links to transmit priority information;

reducing, by the first wireless communication device, transmitter power in response to the transmitter power of the first wireless control device being above a transmitter power threshold and the antenna isolation of the second wireless communication device being below a antenna isolation threshold to enable the first and second wireless communication devices to communicate simultaneously with the first and second wireless communication networks over interfering frequency ranges;

communicating, simultaneously, over the first wireless communication network via the first wireless communication device and the second wireless communication network via the second wireless communication device based on the adjusted configuration, wherein the first wireless communication network and the second wireless communication network operate with interfering frequency ranges;

generating, by at least one of the first wireless communication device or the second wireless communication device, a hardware priority signal based on a determination that antenna isolation has fallen below the antenna isolation threshold, wherein the hardware priority signal includes priority information; and suspending said simultaneous communicating in response to at least one of the first wireless communication device or the second wireless communication device receiving the hardware priority signal.

2. A method as defined in claim 1, wherein exchanging the configuration information comprises exchanging, via the software interface, configuration information indicative of at least one of channel, bandwidth, transmission power, front-end filter, reception sensitivity, or antenna isolation associated with the first and second wireless communication devices.

3. A method as defined in claim 1 wherein the generating comprises generating a hardware priority signal including priority information in response to detecting a condition indicative of communication of critical information and a condition indicative of the first and second wireless communication devices being associated with at least one of identical frequency ranges, adjacent frequency ranges, overlapping frequency ranges, or substantially proximate frequency ranges.

4. A method as defined in claim 1 further comprising transmitting the hardware priority signal including priority information from the first wireless communication device to the second wireless communication device via a first wired link.

5. A method as defined in claim 1 further comprising receiving the hardware priority signal including priority information at the second wireless communication device via a first wired link.

6. A method as defined in claim 1 wherein said suspending comprises delaying or discarding at least one of a communication activity at the first wireless communication device in response to detecting a condition indicative of the second wireless communication device having a higher priority than the first wireless communication device or a communication activity at the second wireless communication device in response to detecting a condition indicative of the first wireless communication device having a higher priority than the second wireless communication device.

7. A tangible computer readable medium including content, which when accessed, causes a machine to:

receive first configuration information associated with a first wireless communication device at a second wireless communication device via a software interface, wherein the configuration information includes at least a transmitter power and antenna isolation information of the second wireless communication device, and wherein the first wireless communication device being associated with a first wireless communication network and the second wireless communication device being associated with a second wireless communication network, wherein the first communication network operates on Wi-Fi technology and the second wireless communication network operates on WiMAX technology;

transmit second configuration information associated with the second wireless communication device to the first wireless communication device, wherein the second confiauration information includes transmitter power and antenna isolation information of the first wireless communication device;

reduce the transmitter power of the second wireless communication device based on the first configuration information to enable the first and second communication devices to communicate simultaneously with the first and second wireless communication networks over interfering frequency ranges;

communicate, simultaneously, over the first wireless communication network via the first wireless communication device and the second wireless communication network via the second wireless communication device based on the adjusted configuration over interfering frequency ranges;

generate, by first wireless communication device a hardware priority signal including priority information based on a the antenna isolation of the first wireless communication device being below an antenna isolation threshold and the transmitter power of the second wireless communication device being above a transmitter power threshold;

suspend said communicating over the second wireless communication network in response to receipt of the hardware priority signal; and wherein the first and second wireless communication devices are integrated within a single platform and operatively coupled to each other via one or more wired links to communicate the priority information.

8. A tangible computer readable medium as defined in claim 7, wherein the content, when accessed, causes the machine to transmit the second configuration information by transmitting further information indicative of at least one of channel, bandwidth, front-end filter, or reception sensitivity associated with the second wireless communication device.

9. A tangible computer readable medium as defined in claim 7, wherein the content, when accessed, causes the machine to generate the hardware priority signal including priority information in response to detecting a condition indicative of communication of critical information and a condition indicative of the first and second wireless communication devices being associated with at least one of identical frequency ranges, adjacent frequency ranges, overlapping frequency ranges, or substantially proximate frequency ranges.

10. A tangible computer readable medium as defined in claim 7, wherein the content, when accessed, causes the machine to receive an inbound priority signal including priority information from the first wireless communication device at the second wireless communication device via the one or more wired links.

11. A tangible computer readable medium as defined in claim 7, wherein the content, when accessed, causes the machine to suspend said communicating by causing the machine to delay or discard a communication activity at the second wireless communication device in response to detecting a condition indicative of the first wireless communication device having a higher priority than the second wireless communication device based on an inbound priority signal including priority information from the first wireless communication device.

12. An apparatus comprising:
a first wireless communication device having a first device driver and a first network interface device, the first wireless communication device being associated with a first wireless communication network that operates on Wi-Fi technology;
a second wireless communication device having a second device driver and a second network interface device, the second wireless communication device being associated with a second wireless communication network that operates on WiMAX technology,
wherein the first and second network interface devices being operatively coupled to each other via two uni-directional wired links to communicate priority information, and
wherein the first and second device drivers are operatively coupled to each other to exchange configuration information, wherein the configuration information includes at least a transmitter power and antenna isolation information of the first wireless communication device and the second wireless communication device to enable the first and second wireless communication devices to adjust a configuration, wherein the adjusted configuration includes a reduced transmitter power that is reduced based on the transmitter power of the first wireless communication device being above a transmitter power threshold and antenna isolation of the second wireless communication device being below an antenna isloation threshold to enable the first and second wireless communication devices to communicate simultaneously with the first and second wireless communication networks over interfering frequency ranges, to generate a hardware priority signal based on a determination that the antenna isolation has fallen below another antenna isloation threshold, and to suspend communication over at least one of the first and second wireless communication networks in response to receipt of the hardware priority signal that includes priority information.

13. An apparatus as defined in claim 12, wherein the configuration information comprises information further indicative of at least one of channel, bandwidth, front-end filter, or reception sensitivity associated with at least one of the first wireless communication device or the second wireless communication device.

14. An apparatus as defined in claim 12, wherein at least one of the first device driver or the second device driver generates the hardware priority signal including priority information in response to detecting a condition indicative of communication of critical information and a condition indicative of the first and second wireless communication devices being associated with at least one of identical frequency ranges, adjacent frequency ranges, overlapping frequency ranges, or substantially proximate frequency ranges.

15. An apparatus as defined in claim 12, wherein the first network interface device transmits the hardware priority signal including priority information to the second network interface device via a first wired link of the two uni-directional wired links.

* * * * *